(12) United States Patent
Taft et al.

(10) Patent No.: US 6,544,453 B2
(45) Date of Patent: Apr. 8, 2003

(54) METHOD OF USING LOW PROFILE ADDITIVES FOR CROSSLINKABLE RESINS

(75) Inventors: David D. Taft, Atherton, CA (US); Steven P. Bitler, Menlo Park, CA (US)

(73) Assignee: Landec Corporation, Menlo Park, CA (US)

( * ) Notice: Subject to any disclaimer, the term of this patent is extended or adjusted under 35 U.S.C. 154(b) by 225 days.

(21) Appl. No.: 09/734,434

(22) Filed: Dec. 11, 2000

(65) Prior Publication Data

US 2002/0038922 A1 Apr. 4, 2002

Related U.S. Application Data

(63) Continuation of application No. 09/008,676, filed on Jan. 16, 1998, now abandoned.

(51) Int. Cl.[7] .......................... B29B 11/06; B29B 11/14; B29K 105/24
(52) U.S. Cl. ............. 264/122; 264/331.11; 264/331.12; 264/331.13; 264/331.15; 264/331.18; 264/331.21
(58) Field of Search ............................ 264/122, 331.11, 264/331.12, 331.13, 331.15, 331.18, 331.21

(56) References Cited

U.S. PATENT DOCUMENTS

| 3,674,893 A | 7/1972 | Nowak et al. ............... 260/836 |
| 3,718,714 A | 2/1973 | Comstock et al. .......... 260/862 |

(List continued on next page.)

FOREIGN PATENT DOCUMENTS

| EP | 0 362 787 | 11/1989 |
| EP | 0355059 | 2/1990 |
| WO | WO89/06258 | 7/1989 |
| WO | WO 94/06862 | 3/1994 |
| WO | WO 96/27641 | 12/1996 |

OTHER PUBLICATIONS

Pp. 48 to 78 (Chapter 4 by Kenneth E. Atkins) in "Sheet Molding Compounds", edited by Hamid Kia (1993).

Plastics Compounding, Jul./Aug. 1988, pp. 35–45.

"Pigmentation and Shrinkage Control in Fiber Reinforced Molding Compounds," presented at 32nd Annual Technical Conference, 1977, Reinforced Plastics/Composites Institute, The Society of the Plastics Industry, Inc. by K.E. Atkins, R.R. Gentry, V.E. Matthews and R.C. Gandy.

"Observations on the Mechanism of Sink in SMC Moldings," presented at the 31st Annual Techical Conference, 1976, Reinforced Plastics/Composites Institute, The Society of the Plastics Industry, Inc. presented by H. Jeff Boyd.

"Pigmentation and Shrinkage Control in Fiber Reinforced Molding Compounds," presented at High Performance Plastics, National Technical Conference, Society of Plastic Engineers, Oct. 5–7, 1976, Cleveland, OH by K.E. Atkins, R. R. Gentry and V.E. Matthews.

(List continued on next page.)

Primary Examiner—Stephen J. Lechert, Jr.
(74) Attorney, Agent, or Firm—Sheldon & Mak; Jeffrey G. Sheldon

(57) ABSTRACT

Shrinkage of cured resins is reduced by mixing the crosslinkable resin with a low profile additive (LPA). The LPA is in the form of particles which comprise an SCC polymer (or a similar crystalline polymer which melts over a narrow temperature range). The system is cured at a temperature above the melting point of the crystalline polymer ($T_p$), and the system and the LPA are such that at least part of the LPA remains as a separate phase in the curable resin at temperatures below $T_p$. It is believed that at least part of the crystalline polymer remains as a separate phase in the resin as it cures. Preferably at least part of the crystalline polymer forms a separate phase in the cured polymer after it has cooled.

22 Claims, 1 Drawing Sheet

U.S. PATENT DOCUMENTS

| | | | |
|---|---|---|---|
| 3,721,642 A | 3/1973 | Schalin et al. | 260/40 |
| 3,772,241 A | 11/1973 | Kroekel et al. | 260/40 |
| 3,842,142 A | 10/1974 | Harpold et al. | 260/862 |
| 4,125,702 A | 11/1978 | Cooke et al. | 526/323 |
| 4,160,759 A | 7/1979 | Gardner et al. | 260/40 |
| 4,161,471 A | 7/1979 | Kassal | 260/40 |
| 4,245,068 A | 1/1981 | Brewbaker et al. | 525/447 |
| 4,284,736 A | 8/1981 | Comstock et al. | 525/169 |
| 4,288,571 A | 9/1981 | Comstock et al. | 525/170 |
| 4,349,651 A | 9/1982 | Smith | 526/263 |
| 4,358,571 A | 11/1982 | Kaufman et al. | 525/524 |
| 4,374,215 A | 2/1983 | Atkinson | 523/514 |
| 4,420,605 A | 12/1983 | Kaufman | 528/94 |
| 4,430,445 A | 2/1984 | Miyake et al. | 521/38 |
| 4,491,642 A | 1/1985 | Atkins | 523/515 |
| 4,555,534 A | 11/1985 | Atkins | 523/507 |
| 4,659,779 A | 4/1987 | Bagga et al. | 525/118 |
| 4,673,706 A | 6/1987 | Atkins | 525/31 |
| 4,689,388 A | 8/1987 | Hirai et al. | 824/545 |
| 4,701,378 A | 10/1987 | Bagga et al. | 428/414 |
| 4,742,148 A | 5/1988 | Lee et al. | 528/117 |
| 4,933,392 A | 6/1990 | Andrews et al. | 525/110 |
| 5,290,854 A | 3/1994 | Ross et al. | 525/33 |
| 5,376,721 A * | 12/1994 | McGarry et al. | 525/64 |
| 5,428,105 A * | 6/1995 | McGarry et al. | 525/69 |
| 5,504,151 A | 4/1996 | Fisher et al. | 525/49 |
| 5,552,478 A | 9/1996 | Fisher | 525/41 |
| 5,589,538 A | 12/1996 | Rex et al. | 525/28 |
| 5,783,635 A * | 7/1998 | Akiyama et al. | 525/168 |

OTHER PUBLICATIONS

"SMC: Thinner–Smoother–Tougher A New Generation of Low Profile Additives," in Journal of Elastomers and Plastics, vol. 14 p. 117, Apr. 1982 by K.E. Atkins, R.C. Gandy and R.R. Gentry.

Derwent Abstract No. XP 002134749 of Japanese 4209632 (Jul. 31, 1992).

Derwent Abstract No. XP 002134750 of Japanese 6102747 (Jan. 8, 1986).

* cited by examiner

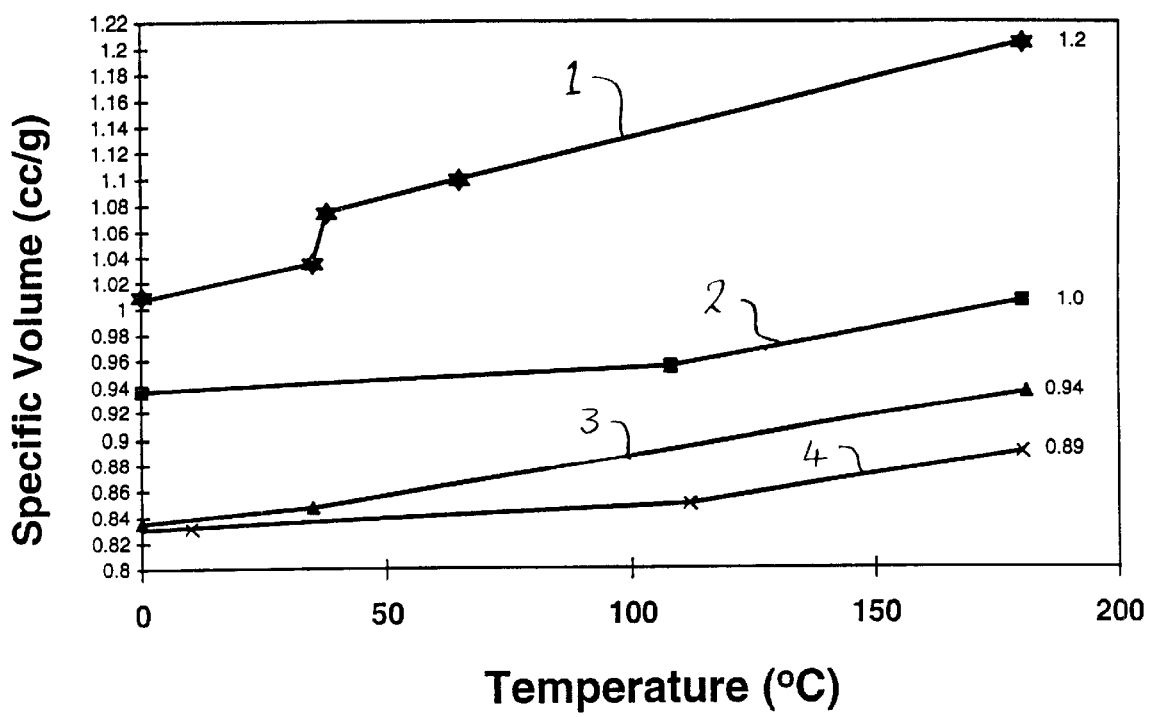

METHOD OF USING LOW PROFILE ADDITIVES FOR CROSSLINKABLE RESINS

CROSS-REFERENCE TO RELATED APPLICATIONS

This application is a continuation of copending, commonly assigned, application Ser. No. 09/008,676, filed Jan. 16, 1998, abandoned, the entire disclosure of which is incorporated herein by reference. It is also related to copending, commonly assigned, application Ser. No. 09/007,921 filed Jan. 16, 1998, abandoned, i.e. on the same day as this application.

BACKGROUND OF THE INVENTION

1. Field of the Invention

This invention relates to low profile additives which control the shrinkage of crosslinkable resin systems when they cure.

2. Introduction to the Invention

Crosslinkable resin systems are well known. It is known that in order to produce such a system which is relatively stable in storage, one of the active chemical moieties (e.g., a catalytic moiety or a reactive moiety) can be present in a "latent" form, which can be activated (by heating or otherwise) when rapid reaction is desired. Reference may be made for example to U.S. Pat. Nos. 4,349,651, 4,358,571, 4,420,605, 4.430,445, 4,659,779, 4,689,388, 4,701,378, 4,742,148 and 4,933,392 and European Patent Publication No. 362787A2. Copending, commonly assigned, U.S. application Ser. Nos. 08/726,739, 08/726,740 and 08/726,741 (each of which was filed Oct. 15, 1996 and claims priority from U.S. application Ser. No. 08/399,724 filed Mar. 7, 1995, now abandoned) and corresponding International Application No. PCTJUS96/03023 (published Sep. 12, 1996, as International Publication No. WO-96/27641) disclose particularly valuable latent materials comprising an active chemical moiety which is bonded to a side chain crystalline (SCC) polymer or to another crystalline polymeric moiety which melts over a narrow temperature range. These latent materials, which are referred to in the applications as polymeric modifying agents, are preferably in the form of particles having an average size of 0.1 to 50 microns. Copending, commonly assigned U.S. application Ser. No. 08/710,161 (Docket No. 10762-4 filed Sep. 12, 1996) and corresponding International Application No. PCT/US 97/16019 (which was not published at the date of this application) disclose that even when there is no chemical bond between the active and polymeric moieties, a physical bond between the moieties can produce a lesser but still useful latent effect application Ser. Nos. 08/726,739, 08/726,740, 08/726,741 and 08/710,161 have all been abandoned in favor of a continuation-in-part application, Ser. No. 09/216,520, filed Dec. 16, 1998 U.S. Pat. No. 6,255,367. It is also known that curable resin systems tend to shrink when they cure, and that in some systems this tendency can be lessened or overcome by adding various polymeric additives; such additives are referred to as low profile additives (often abbreviated to "LPA"s). Reference may be made for example to pages 48 to 78 (Chapter 4 by Kenneth E. Atkins in "Sheet Molding Compounds", edited by Hamid Kia (1993), Plastics Compounding, July/August 1988, pages 35–45, and U.S. Pat. Nos. 3,674,893, 3,718,714, 3,721,642, 3,772,241, 3,842,142, 4,125,702, 4,160,759, 4,161,471, 4,245,068, 4,284,736, 4,288,571, 4,374,215, 4,491,642, 4,555,534, 4,673,706, 5,290,854, 5,428,105, 5,504,151, 5,552,478 and 5,589,538.

The disclosure of each of the US patents and patent applications, International and European patent publications, and literature references referred to in the preceding paragraph is incorporated herein by reference for all purposes.

SUMMARY OF THE INVENTION

We have discovered, in accordance with the present invention, that the shrinkage that takes place when a resin is cured can be reduced or eliminated by mixing the crosslinkable resin with a novel LPA which is in the form of particles which comprise an SCC polymer (or a similar crystalline polymer which melts over a narrow temperature range). The system is cured at a temperature above the melting point of the crystalline polymer ($T_p$), and the system and the LPA are such that at least part of the LPA remains as a separate phase in the curable resin at temperatures below $T_p$. It is believed that at least part of the crystalline polymer remains as a separate phase in the resin as it cures. Preferably at least part of the crystalline polymer forms a separate phase in the cured polymer after it has cooled.

The crystalline polymer can be, but need not be, chemically or physically bound to an active chemical moiety which will take part in the reaction which forms the cured polymer. We believe, therefore, that under appropriate circumstances, some latent materials of the kind described in the copending, commonly assigned US patent applications referred to above will function as LPAs. However, that possibility is not disclosed in those US patent applications or the corresponding PCT applications. Under these circumstances, the extent to which our discovery can be the subject of patent protection may vary from country to country. Accordingly, and since this specification will serve not only as the specification for this US patent application, but also as the priority document for corresponding applications elsewhere, the present invention is broadly defined as any product or process which embodies our discovery and which can properly be the subject of patent protection.

In a first aspect, this invention provides a composition which comprises (1) a matrix material which
  (a) provides a continuous phase, and
  (b) comprises at least one precursor which will react to form a crosslinked polymer; and
(2) a low profile additive (LPA) which
  (a) comprises a crystalline polymer having an onset of melting temperature $T_o$ and a peak melting temperature $T_p$ which is (i) at least 30° C., and (ii) such that $T_p - T_o$ is less than $T_p^{0.7}$, preferably less than 10° C., and
  (b) is in the form of particles which are uniformly suspended in the matrix material;

said composition, when cured at a temperature of $(T_p+10)°$ C. and then cooled to room temperature, having a shrinkage which is less than 0.5 times the shrinkage of a composition which is identical except that it does not contain the LPA and is cured under the same conditions.

The composition may also have at least one of the following characteristics, each of which provides an alternative or additional distinction over the disclosure of the commonly assigned US applications and their PCT equivalents referred to above.

(1) At least 10%, at least 20% or at least 30% of the crystalline polymer is present in the form of particles which do not contain any material which takes part in the reaction which forms the crosslinked polymer.

(2) The composition, when maintained at 40° C., doubles in viscosity in less than 240 hours, e.g. in less than 24 hours.

(3) The LPA is present in the form of particles having an average size of at least 75 microns.

(4) When the composition is heated from $(T_p-20)°$ C. to $(T_p+10)°$ C., there is an increase by a factor of less than 50, e.g., less than 5, in the effective concentration of each of the materials which takes part in the reaction which forms the crosslinked polymer.

It is to be understood that these characteristics (1) to (4) are not intended to represent factors which will be technically advantageous.

The composition may also have one or both of the following characteristics (5) and (6) which will help to reduce the shrinkage of the cured resin.

(5) At most 50% of the crystalline polymer dissolves in the matrix material or in reaction products thereof when the composition is maintained at a temperature of $(T_p+10)°$ C. for 15 minutes.

(6) When the composition is cured at a temperature of $(T_p+10)°$ C. and then cooled to room temperature, the cured composition contains at least part of the crystalline polymer as a separate phase.

In a second preferred aspect, this invention provides a process for preparing a shaped article of a crosslinked polymer, the process comprising (A) placing in a mold a composition which comprises
   (1) a matrix material which comprises at least one precursor which will react to form a crosslinked polymer, and
   (2) a low profile additive (LPA) which is uniformly distributed as a separate phase in the matrix and which comprises a crystalline polymer having an onset of melting temperature $T_o$ and a peak melting temperature $T_p$ which is (i) at least 30° C., and (ii) such that $T_p-T_o$ is less than $T_p^{0.7}$;
the composition preferably being placed in the mold at a temperature less than $T_p$, particularly less than $T_o$;

(B) maintaining the composition in the mold at a temperature which is greater than $T_p$ and for a time such that the precursor reacts to form the crosslinked polymer; and (C) cooling the product of step (B) to obtain the shaped article of the crosslinked polymer;

the composition and the process conditions being such that the shaped article has a shrinkage which is at least one of
   (i) a shrinkage of less than 5%, preferably less than 0.5%, particularly less than 0.05%, especially a "negative shrinkage", i.e. an expansion, and
   (ii) a shrinkage which is less than 0.5 times the shrinkage of a shaped article prepared in the same way from a reaction mixture which is the same except that it does not contain the LPA.

The terms "placing in a mold" a composition and "maintaining the composition in the mold" are intended to include any process in which the composition is shaped into a desired shape and is maintained in that shape, or a related shape, while it is being cured. Thus the term includes for example the use of processes in which a closed mold is used and pultrusion processes (in which the composition is cured as it is pulled through a mold).

BRIEF DESCRIPTION OF THE DRAWING

The FIGURE in the accompanying drawing shows the change in specific volume with temperature of an LPA of the invention and of three known LPA's.

DETAILED DESCRIPTION OF THE INVENTION

Definitions and Abbreviations

In this specification, parts and percentages are by weight, viscosities are in centipoise and are measured using a Brookfield LVT viscometer, temperatures are in ° C., and $T_o$, $T_p$ and heat of fusion are determined using a differential scanning calorimeter (DSC), at a rate of temperature change of 10° C./min on the second heat cycle. $T_o$ and $T_p$ are measured in the conventional way well known to those skilled in the art. Thus $T_p$ is the temperature at the peak of the DSC curve, and $T_o$ is the temperature at the intersection of the baseline of the DSC peak and the onset line, the onset line being defined as the tangent to the steepest part of the DSC curve below $T_p$. The abbreviations $M_w$ and $M_n$ are used to denote weight average and number average molecular weight respectively. The abbreviation CxA is used to denote an n-alkyl acrylate in which the n-alkyl group contains x carbon atoms, the abbreviation Cx alkyl is used herein to denote an n-alkyl group which contains x carbon atoms, and the abbreviations CxM is used to denote an n-alkyl methacrylate in which the n-alkyl group contains x carbon atoms. Other abbreviations are given elsewhere in the specification.

Matrix Materials

The terms "matrix" and "matrix materials" are used in this specification to denote any material or mixture of materials comprising a precursor which will react with itself to form a crosslinked polymer, or two or more precursors which will react with each other to form a crosslinked polymer, or one or more precursors which will react with one or more additional materials (added at a later stage) to form a crosslinked polymer. One or more of the precursors can be in latent form. The matrix generally comprises at least one solid or liquid material which provides a continuous phase in which the LPA is distributed. The matrix can include, in addition to the precursor(s) and the LPA, one or more other materials. Such materials can be compounds which influence the nature or the rate of the crosslinking reaction, and which can be in latent form, e.g. catalysts, polymerization inhibitors, and polymerization initiators. Such materials can also be added at a later stage, prior to the crosslinking reaction. Initiators may be present, for example, in amount 0.1 to 5%, and include organic derivatives of hydrogen peroxide such as para-t-butyl peroxybenzoate and 1,1-di-t-amyl peroxycyclohexane. Such other materials can also be, for example, materials which affect the physical properties of the curable resin or of the cured resin, for example fillers, other LPAs, thickening agents, mold release agents, viscosity reducers, wetting agents and colorants. Such other materials can also be coadditives as disclosed in the pending US applications referred to above. Suitable fillers include inorganic and organic materials, including fibrous fillers such as glass, Kevlar or carbon fibers, hollow glass microspheres, hollow polymeric microspheres, calcium carbonate and alumina trihydrate. The amount of filler, if present, may be 10 to 70%, for example 15 to 35%, and may be such that the curable composition has the consistency of a paste or is even a self-supporting solid. The amount of mold release agent, if present, may be 1 to 4%; mold release agents include calcium and zinc sterates. The amount of colorant, if present, may be 0.5 to 4%. The amount of thickener, if present, may be 0.1 to 3%; thickeners include magnesium oxide and calcium hydroxide.

The invention is particularly useful in the preparation of molded products of a cured resin derived from an unsaturated polyester (optionally with styrene), a vinyl ester, an acrylic resin, or an epoxy. The term "unsaturated polyester" is used in this specification in its conventional sense to mean a polymer in which the monomer units are linked to each other through an ester group and which contains carbon-carbon double bonds that are capable of undergoing further polymerization. The term "vinyl ester" is likewise used in its conventional sense to denote a subclass of the unsaturated polyesters, namely those which contain vinyl groups, in particular polymers made by addition reactions involving epoxides and acids. In order to prepare crosslinked thermoset resins from these polymers, they are generally dissolved in a monomer such as styrene and then copolymerized with the monomer. Other precursors include cyanate esters, isocyanurates, imides, bismaleimides, ureas, cyanoacrylates, epoxy novolacs, urethanes and phenolics.

For further details of suitable precursors of the cured resin and other ingredients, reference should be made to the documents referred to above and incorporated herein by reference, and to (a) Handbook of Epoxy Resins by Henry Lee and Kris Neville; 1967; McGraw-Hill Inc.

(b) Epoxy Resins, Chemistry and Technology 2nd Edition, edited by Clayton A. May; 1988; Marcel Dekker, Inc.

(c) Polyurethanes, Chemistry, Technology and Applications by Z. Wirpsza; 1993; Ellis Norwood Ltd.

(d) The ICI Polyurethanes Book by George Woods; 1987; John Wiley & Sons, Inc.

(e) Structural Adhesives, Chemistry and Technology, edited by S. R. Hartshort; 1986; Plenum Press (f) Test Methods for Epoxy Compounds; published by the Society of the Plastics Industry, Inc., Epoxy Resin Formations Division (g) Thermal Characterization of Polymeric Materials, edited by Edith A. Turi; 1981; Academic Press, Inc., and (h) Reaction Polymers, edited by Wilson F. Gum et al, Hanser Publishing.

The disclosure of each of documents (a) to (h) above is incorporated herein by reference.

LPAs

The crystalline polymer in the LPA (the term "crystalline polymer" being used to include a crystalline polymeric moiety which is chemically bound to a non-crystalline moiety) can be a single polymer or a mixture of polymers, and the polymer can be a homopolymer, or a copolymer of two or more comonomers, including random copolymers, graft copolymers, block copolymers and thermoplastic elastomers. Preferably at least part of the polymeric moiety is derived from a side chain crystallizable (SCC) polymer. The SCC polymer may for example be derived from one or more acrylic, methacrylic, olefinic, epoxy, vinyl, ester-containing, amide-containing or ether-containing monomers. The molecular weight of an SCC polymer is relatively unimportant to its $T_p$, but is generally an important factor in determining the $T_p$ of other polymers. The preferred SCC polymeric moieties are described in detail below. However, the invention includes the use of other crystalline polymers having the desired properties. Such other polymers include for example polymers in which the crystallinity results exclusively or predominantly from the polymer backbone, e.g. polymers of a-olefins containing 2 to 12, preferably 2 to 8, carbon atoms, e.g. polymers of monomers having the formula $CH_2$=CHR, where R is hydrogen, methyl, propyl, butyl, pentyl, 4-methylpentyl, hexyl or heptyl, as well as other polymers such as polyesters, polyamides, and polyalkylene oxides, for example polytetrahydrofuran.

It is important that the polymeric moiety should melt over a relatively small temperature range. The closer $T_p$ is to room temperature, the more rapid the transition should preferably be. Thus $T_p-T_o$ is preferably less than $T_p^{0.7}$, particularly less than $T_p^{0.6}$, $T_o$ and $T_p$ being in ° C. $T_p$ can vary widely, depending on the conditions under which the composition is to be cured. Thus in general, $T_p$ is preferably at least 40° C., particularly at least 45° C., but is generally not more than 120° C. $T_p-T_o$ is preferably less than 10° C., particularly less than 8° C., more particularly less than 6° C., especially less than 4° C.

SCC polymers which can be used in this invention include known SCC polymers, e.g. polymers derived from one or more monomers such as substituted and unsubstituted acrylates, methacrylates, fluoroacrylates, vinyl esters, acrylamides, methacrylamides, maleimides, α-olefins, p-alkyl styrenes, alkylvinyl ethers, alkylethylene oxides, alkyl phosphazenes and amino acids; polyisocyanates; polyurethanes; polysilanes; polysiloxanes; and polyethers; all of such polymers containing long chain crystallizable groups. Suitable SCC polymers are described for example in J. Poly. Sci. 60, 19 (1962), J. Poly. Sci, (Polymer Chemistry) 7, 3053 (1969), 9, 1835, 3349, 3351, 3367, 10, 1657, 3347, 18, 2197, 19, 1871, J. Poly. Sci, Poly-Physics Ed 18 2197 (1980), J. Poly. Sci, Macromol. Rev, 8, 117 (1974), Macromolecules 12, 94 (1979), 13, 12, 15, 18, 2141, 19, 611, JACS 75, 3326 (1953), 76; 6280, Polymer J 17, 991 (1985); and Poly. Sci USSR 21, 241 (1979) and in the commonly assigned US patent applications referred to above and their PCT equivalents.

Preferred SCC polymers comprise side chains comprising linear polymethylene moieties containing 12 to 50, especially 14 to 22, carbon atoms, or linear perfluorinated or substantially perfluorinated polymethylene moieties containing 6 to 50 carbon atoms. Polymers containing such side chains can be prepared by polymerizing one or more corresponding linear aliphatic acrylates or methacrylates, or equivalent monomers such as acrylamides or methacrylamides. A number of such monomers are available commercially, either as individual monomers or as mixtures of identified monomers, for example C12A, C14A, C16A, C18A, C22A, a mixture of C18A, C20A and C22A, a mixture of C26A to C40A, fluorinated C8A (AE800 from American Hoechst) and a mixture of fluorinated C8A, C10A and;C12A (AE12 from American Hoechst). The polymers can optionally also contain units derived from one or more other comonomers preferably selected from other alkyl, hydroxyalkyl and alkoxyalkyl acrylates, methacrylates (e.g. glycidal methacrylate), acrylamides and methacrylamides; acrylic and methacrylic acids; acrylamide; methacrylamide; maleic anhydride; and comonomers containing amine groups. Such other co-monomers are generally present in total amount less than 50%, particularly less than 35%, especially less than 25%, e.g. 0 to 15%. They may be added to modify the melting point or other physical properties of the polymers, in particular so as to make the crystalline polymer less compatible with the precursor(s) and/or the crosslinked resin, and thus promote the desired LPA activity.

The LPA activity of the crystalline polymer is believed to result at least in part from the sharp increase in volume which takes place as the polymer melts. This is demonstrated in the accompanying FIGURE, which shows the change in specific volume with temperature of an LPA of the invention having a $T_p$ of about 40° C. (curve 1) and of three known LPAs, polystyrene (curve 2), polyvinyl acetate (curve 3) and polymethyl methacrylate (curve 4). One of the advantages of using an SCC polymer as an LPA is that it is easy to make an SCC polymer which shows this sharp increase in volume at a desired temperature in relation to the polymeric system to be cured. This is particularly important with the trend towards the use of lower curing temperatures.

The amount of LPA which should be used depends on the LPA and the resin system and the amount of shrinkage that can be tolerated. In general, however, the amount required is less than is needed with known LPAs for comparable results. The amount can be, for example, 1 to 15%, with amounts of 2 to 10%, particularly 3 to 5%, based on the weight of the precursor.

EXAMPLES

The invention is illustrated by the following Examples, some of which are comparative examples, and in which the following abbreviations are used.

Aropol is a liquid mixture of 70% of an unsaturated polyester and 30% of styrene, and is available from Ashland Chemical under the tradename Aropol 2036.

LPA1(Co) is a particulate cobalt-containing polymeric catalyst available from Landec under the tradename Intelimer 6050. The particles have an average size of 6 to 8 microns, are composed of the reaction product of cobalt acetate tetrahydrate (8.45 parts) and an SCC polymer (100 parts), and contain 2% cobalt. The SCC polymer is a polymer of C22A (11.25 parts) and AA (1 part) having $M_w$=20,000, $M_n$=10,000, $T_o$=65° C. and $T_p$=68° C.

LPA2 is a particulate SCC polymer. The particles have an average size of 6 to 8 microns and are composed of a polymer of C22A (99 parts) and AA (1 part) having $M_w$=11,000, $M_n$=6,700, $T_o$=62° C. and $T_p$=65° C.

CONap is cobalt naphthenate in mineral spirits, containing 6% elemental cobalt, available from Strem Chemical.

TBPB-HA-M1 is a highly active t-butyl perbenzoate available from Aztec Peroxides under the tradename TBPB-HA-M1.

Surfactant is a silicone-free defoaming additive available from Byk-Chemie under the tradename, A-555.

Filler is precipitated calcium carbonate having a particle size of 50 to 100 microns, available from Specialty Mineral Inc. under the tradename Albaglos.

In each Example, the ingredients and amounts thereof set out in the Table below, together with 1.5 parts of TBPB-HA-M1 and 0.2 parts of Surfactant, were mixed at ambient temperature in a Brabender mixer. A 25 ml beaker made of tetrafluoroethylene was then filled to the top with the mixture and an aluminum plate was clamped to the top of the beaker so that there was no air in the beaker. The beaker was then placed in a bath of oil at 140° C. for 20 minutes. The results of a visual inspection of the cured resin are given in the Table below. The shrinkage of the resin was characterized by one of the following (a) a numerical estimate of the shrinkage
(b) P, which means that there was macroscopic phase separation such that the physical integrity of the cured resin was compromised,
(c) C, which means that there were cracks up to 1 mm wide in the surface, and
(d) U, which means that the resin was uniform, with no cracks and minimal shrinkage.

The smoothness (or gloss) of the surface of the cured resin was characterized (when there was no phase separation) on the following scale: (1) flat<(2) semigloss<(3) glossy<(4) glossier<(5) glossiest.

TABLE

| Example No. | 1 | 2 | 3 | 4 | 5 | 6 | 7 | 8 | 9 | 10 |
|---|---|---|---|---|---|---|---|---|---|---|
| Resin | 100 | 100 | 100 | 100 | 100 | 100 | 100 | 100 | 100 | 100 |
| LPA1 (Co) | — | 2 | — | 2 | — | — | — | — | 2 | 4 |
| LPA2 | — | — | 10 | 8 | — | 10 | 4 | 2 | — | — |
| CoNap | .167 | — | .167 | — | — | — | — | — | — | — |
| Filler | — | — | 13 | — | 150 | 150 | 150 | 150 | 150 | 150 |
| Results | | | | | | | | | | |
| Surface | 2 | 3 | P | P | 1 | 5 | 4 | 3 | 2 | 2 |
| Shrinkage | 5% | 4.5% | P | P | C | U | U | U | U | U |

What is claimed is:

1. A process for preparing a shaped article of a crosslinked polymer, the process comprising
    (A) placing in a mold a composition which comprises
        (1) a matrix material which
            (a) provides a continuous phase and
            (b) comprises at least one precursor which will react to form a crosslinked polymer; and
        (2) a low profile additive (LPA) which
            (a) comprises a crystalline polymer having an onset of melting temperature $T_o$ and a peak melting temperature $T_p$ which is (i) at least 30° C., and (ii) such that $T_p-T_o$ is less than $T_p^{0.7}$, at least 10% by weight of the crystalline polymer being in the form of solid particles which are free of any material which takes part in the reaction which forms the crosslinked polymer, and
            (b) is in the form of particles which are uniformly suspended in the matrix material;
    (B) maintaining the composition in the mold at a temperature which is greater than $T_p$ and for a time such that the precursor reacts to form the crosslinked polymer; and
    (C) cooling the product of step (B) to obtain the shaped article of the crosslinked polymer;
    the composition and the process conditions being such that the shaped article has a shrinkage which is at least one of
        (i) a shrinkage of less than 5%, and
        (ii) a shrinkage which is less than 0.5 times the shrinkage of a shaped article prepared in the same way from a reaction mixture which is the same except that it does not contain the LPA.

2. A process according to claim 1 which is a pultrusion process.

3. A process according to claim 1 wherein the composition is placed in a mold in step (A), and the mold is closed before step (B).

4. A process according to claim 1 wherein the shaped article has a shrinkage of less than 0.5%.

5. A process according to claim 1 wherein the crystalline polymer is a side chain crystalline (SCC) polymer and is present in the composition placed in the mold in amount from 2 to 10%, based on the weight of the precursor; and the shaped article contains at least part of the SCC polymer as a separate phase.

6. A process according to claim 1 wherein the precursor in the matrix material comprises an unsaturated polyester, and the composition further comprises a catalyst for the reaction which forms the crosslinked polymer from the unsaturated polyester.

7. A process according to claim 1 wherein the precursor in the matrix material comprises a vinyl ester, an acrylic resin, or precursors for an epoxy resin.

8. A process for preparing a shaped article of a crosslinked polymer, the process comprising
   (A) placing in a mold a composition which comprises
      (1) a matrix material which comprises at least one precursor which will react to form a crosslinked polymer, and
      (2) a low profile additive (LPA) which is uniformly distributed in the matrix and which comprises a side chain crystalline (SCC) polymer having an onset of melting temperature $T_o$ and a peak melting temperature $T_p$ which is (i) at least 30° C., and (ii) such that $T_p - T_o$ is less than 10° C., at least 30% by weight of the SCC polymer being in the form of solid particles which are free of any material which takes part in the reaction which forms the crosslinked polymer;
   (B) maintaining the composition in the mold at a temperature which is greater than $T_p$ and for a time such that the precursor reacts to form the crosslinked polymer; and
   (C) cooling the product of step (B) to obtain the shaped article of the crosslinked polymer;
   the composition and the process conditions being such that the shaped article has a shrinkage of less than 0.5%.

9. A process according to claim 8 wherein the LPA is present in amount from 2 to 10%, based on the weight of the precursor, and consists essentially of the SCC polymer.

10. A process according to claim 8 wherein the SCC polymer comprises units derived from an n-alkyl acrylate in which n-alkyl group contains 14 to 22 carbon atoms.

11. A process according to claim 8 wherein the shaped article has a shrinkage of less than 0.05%.

12. A process according to claim 8 wherein the shaped article contains at least part of the crystalline polymer as a separate phase.

13. At A process according to claim 8 wherein the precursor in the matrix material comprises an unsaturated polyester, and the composition further comprises a catalyst for the reaction which forms the crosslinked polymer from the unsaturated polyester.

14. A process according to claim 8 wherein precursor in the matrix material further comprises styrene.

15. A process according to claim 8 wherein the precursor in the matrix material is a precursor for an epoxy resin.

16. A process according to claim 8 wherein the precursor in the matrix material comprises a vinyl ester or an acrylic resin, and the composition further comprises a catalyst for the reaction which forms the crosslinked polymer from the precursor.

17. A process according to claim 8 which is a pultrusion process.

18. A process according to claim 8 wherein the composition is placed in a mold in step (A), and the mold is closed before step (B).

19. A process according to claim 8 wherein, in the composition as it is placed in the mold, the LPA is present in the form of
   (a) particles which do not contain any material which takes part in the reaction which forms the crosslinked polymer, and
   (b) particles which
      (i) do contain a material which takes part in the reaction which forms the crosslinked polymer and
      (ii) undergo a physical change when the composition is heated above $T_p$, thus increasing the effective concentration of said material.

20. A process according to claim 19 wherein the crystalline polymer in the particles of type (a) is different from the crystalline polymer in the particles of type (b).

21. A process according to claim 1, wherein the composition contains a catalyst for the reaction which forms the crosslinked polymer, and none of said catalyst is chemically bound to the crystalline polymer.

22. A process according to claim 1, wherein substantially all of the crystalline polymer is in the form of solid particles which are free of any material which takes part in the reaction which forms the crosslinked polymer.

* * * * *